United States Patent [19]

Geno et al.

[11] Patent Number: 4,798,369
[45] Date of Patent: Jan. 17, 1989

[54] ULTRASONIC AIR SPRING SYSTEM

[75] Inventors: Wayne H. Geno, Cicero, Ind.; David A. Weitzenhof, Akron, Ohio

[73] Assignee: The Firestone Tire & Rubber Company, Akron, Ohio

[21] Appl. No.: 116,189

[22] Filed: Nov. 3, 1987

[51] Int. Cl.$^4$ ............... B60G 17/04; B60G 17/08
[52] U.S. Cl. ........................ 267/64.11; 73/632; 73/658; 188/299; 267/64.27; 267/64.28; 267/122; 280/707; 280/711; 340/52 R; 340/605; 367/96; 367/99
[58] Field of Search .... 267/64.11, 64.28, 64.16–64.27, 267/122, 123; 280/707, 6.1, 6 R, DIG. 1, 711, 714; 188/299, 268, 1.11; 340/605, 52 R; 367/144, 96, 99; 310/268; 73/645–648, 11, 658, 632–644, 587, 589; 364/424; 342/123; 324/61 R

[56] References Cited

U.S. PATENT DOCUMENTS

| | | | |
|---|---|---|---|
| 2,743,429 | 4/1956 | Erdman et al. | 340/1 |
| 3,150,867 | 9/1964 | Droegkamp | 267/8 |
| 3,269,685 | 8/1966 | Wallace | 248/346 |
| 3,339,910 | 9/1967 | Jackson | 267/64.21 |
| 3,524,634 | 8/1970 | Schmidt | 267/64.16 |
| 4,329,452 | 7/1983 | Ohmori | 280/6.1 |
| 4,386,791 | 6/1983 | Watanabe | 267/64.21 X |
| 4,398,704 | 8/1983 | Buchanan, Jr. et al. | 267/64.21 |
| 4,518,169 | 5/1985 | Kuroki | 280/6 R |
| 4,543,649 | 9/1985 | Head et al. | 367/96 |
| 4,577,509 | 3/1986 | Moser | 73/658 |
| 4,587,850 | 5/1986 | Moser | 73/658 |
| 4,638,670 | 1/1987 | Moser | 188/1.11 X |
| 4,674,767 | 6/1987 | Kuroki et al. | 280/DIG. 1 X |
| 4,677,263 | 6/1987 | Hamilton et al. | 280/DIG. 1 X |
| 4,678,203 | 7/1987 | Röhner et al | 267/64.28 X |
| 4,722,547 | 2/1988 | Kishi et al. | 280/707 |
| 4,729,459 | 3/1988 | Inagaki et al. | 188/1.11 X |
| 4,741,416 | 5/1988 | Tanigawa | 188/299 |
| 4,741,554 | 5/1988 | Okamoto | 280/707 X |
| 4,749,210 | 6/1988 | Sugasawa | 280/707 |
| 4,753,328 | 6/1988 | Williams et al. | 280/707 X |

FOREIGN PATENT DOCUMENTS

| | | | |
|---|---|---|---|
| 0813025 | 3/1981 | U.S.S.R. | 188/298 |
| 2177475 | 1/1987 | United Kingdom | 267/64.27 |

Primary Examiner—Douglas C. Butler
Attorney, Agent, or Firm—Ronald Brietkrenz

[57] ABSTRACT

An ultrasonic air spring system adapted to be mounted on a vehicle for absorbing road shocks exerted on the vehicle and for maintaining the vehicle body level with respect to the axles. An air spring includes an end plate and a piston sealingly connected to the open ends of the flexible elastomeric sleeve to form a pressurized fluid chamber therebetween. A transducer is mounted on the end plate within the fluid chamber and transmits ultrasonic signals through the fluid chamber toward the piston and picks up reflected signals therefrom. A signal is generated by the transducer in response to the reflected signals and fed to a microprocessor based control module. The control module determines whether the air requires fluid feed or exhaustion and will then implement control of inlet or exhaust valves to achieve a desired axial separation between the end plate and piston.

6 Claims, 2 Drawing Sheets

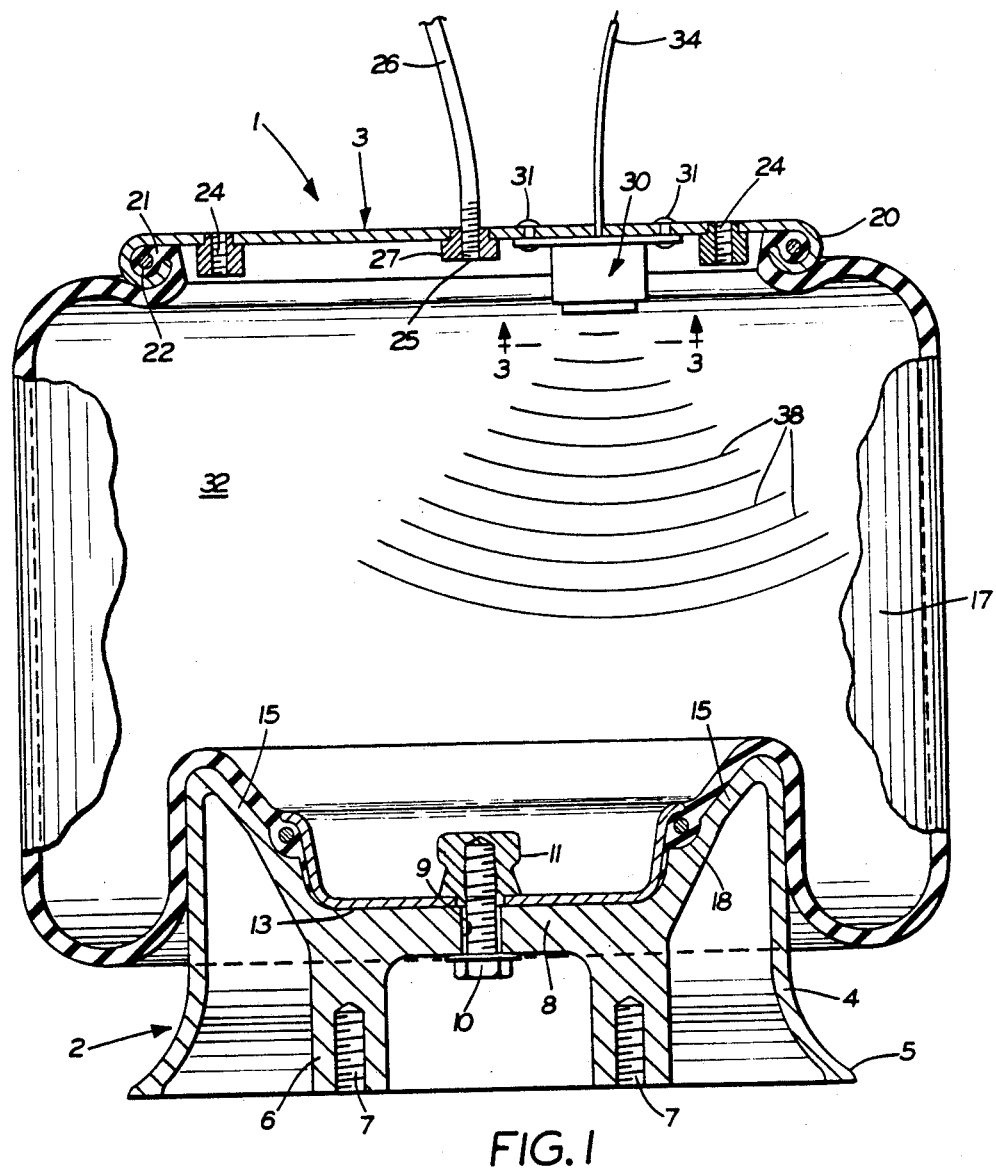
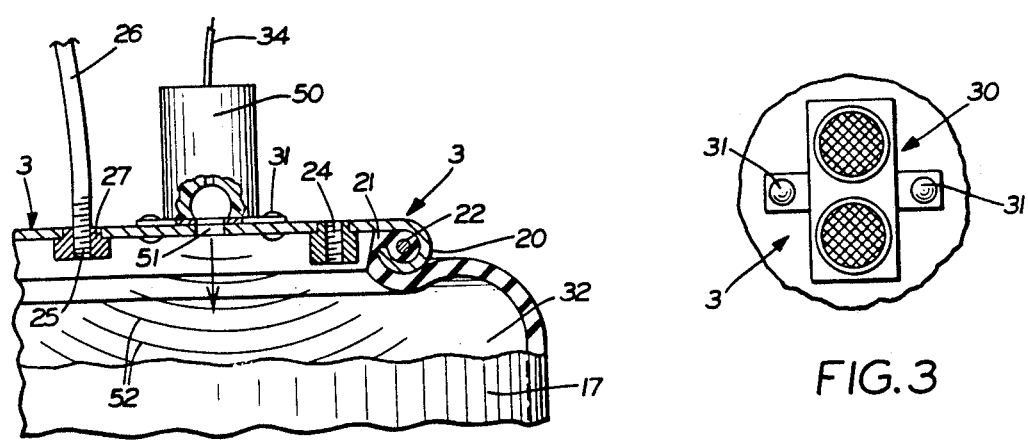
FIG. 2
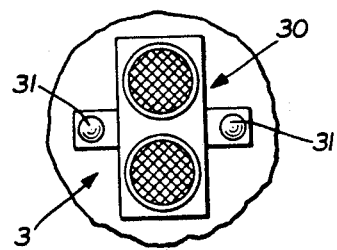
FIG. 3
FIG. 1

ULTRASONIC AIR SPRING SYSTEM

TECHNICAL FIELD

The invention relates to vehicle suspensions and particularly to an air spring having an ultrasonic system incorporated therewith for maintaining the desired axial spacing between the end members of the spring and correspondingly spaced portions of the vehicle on which the spring is attached and for maintaining a predetermined damping characteristic during vehicle motion. More particularly, the invention relates to an air spring and/or air strut having an ultrasonic transducer mounted within the interior of an air pressure chamber and a control circuit which will initiate a response to either fill or release fluid from within the chamber to maintain the desired separation between the vehicle components and for maintaining certain damping characteristics of the spring.

BACKGROUND ART

Pneumatic springs, commonly referred to as air springs and/or air struts, have been used with motor vehicles for a number of years to provide cushioning between the movable parts of the vehicle, primarily to absorb shock loads impressed on the vehicle axles by the wheel striking an object in the road or falling into a depression. These air springs usually consist of a flexible elastomeric sleeve or bellows containing a supply of compressed air having one open end connected to an end plate with the other open end sealingly connected to a piston which extends into the fluid chamber. The piston causes compression and expansion of the fluid within the chamber as the vehicle experiences the road shock to absorb the shock. These air springs also maintain a predetermined spacing between the vehicle components to which they are attached and are generally mounted on the vehicle axles to support the body portion of the vehicle from the axles. In addition, the air springs maintain the vehicle body at a predetermined level above the vehicle axle in order for the air spring to be able to withstand the road shock loads exerted thereon by providing sufficient jounce or collapse movement and rebound or expended movement of the air spring without damaging the flexible sleeve and connected end members. It is also desirable to be able to instantaneously regulate the amount of fluid in the air spring to compensate for shocks exerted on the air spring by road surface variations. The term air spring as used herein also includes devices having an air or fluid strut incorporated with the flexible sleeve for dampening the road inputs.

In order for the air spring to perform satisfactorily it is necessary that the proper amount of pressurized fluid be contained within the flexible sleeve to insure the correct axial spacing between the end members of the air spring and to maintain predetermined damping characteristics while the air spring is encountering road shocks. Also, most vehicles will be equipped with at least two air springs spaced from each other and mounted adjacent the ends of each of the vehicle axles to insure leveling of the vehicle body. Therefore it is important that the correct amount of pressurized fluid, generally air, be maintained in each of the air springs to enable the air springs to provide their desired shock absorbing feature in addition to maintaining the vehicle body level with respect to the axle.

Certain of these air springs are provided with a sealed flexible sleeve whereby the pressurized fluid remains trapped within the chamber whereas other air springs are provided with pressurized air control systems for supplying make up air into the air chamber and/or exhausting air therefrom in order to maintain the desired amount of pressurized air in the chamber.

Various types of automatic control systems have been devised for use with air springs to maintain the desired spacing between the end members thereof. Certain systems use the "Hall effect" or magnetic reed switches whereas others use light sensors and photodetectors for detecting the spacing between the end members. Still other air springs use contact switches mounted either externally or internally of the pressurized fluid chamber for determining the separation of the end members and for introducing or exhausting air into and from the fluid chamber in response to signals received from such detecting mechanism.

Many of these prior art air spring systems have the disadvantage of using component parts located exteriorly of the air spring, either mounted on the air spring or vehicle, or a combination of both, which subjects the components to the harsh road environment to which a vehicle is subjected. Whereas, the components of other systems mechanically engage each other ultimately requiring replacement or repair due to the mechanical interaction of these control system components.

U.S. Pat. No. 3,150,867 discloses a self-contained shock absorber and self-leveling device which through a sequence of valving uses the pumping action of the shock absorber to jack up the frame of the vehicle to a predetermined height.

U.S. Pat. Nos. 3,269,685 and 4,391,452 disclose vehicle leveling systems which use photoelectric cells as a concontact height detecting device.

U.S. Pat. No. 2,743,429 discloses the use of an ultrasonic transducer to determine the relative distance of two objects when one of the objects is in motion with respect to the other in which the distance information energizes a servo system to move one of the objects.

U.S. Pat. No. 4,518,169 discloses an ultrasonic height sensing device which provides height signal information to a feedback system to automatically adjust vehicle height. However this system measures the height using ultrasonic transducers mounted on the vehicle body whereby such transducers would be subject to the harsh environment to which a vehicle is constantly exposed.

U.S. Pat. No. 4,543,649 discloses an ultrasonic transducer for determining the relative position of a piston in a rigid housing in combination with a feedback control system for compensating for any displacement of the piston. The ultrasonic transducer insures that the piston is maintained in a relative position within the housing.

Although certain prior art devices use ultrasonic transducers for adjusting the height or spacing between components, none of said prior art devices disclose or suggest the use of such an ultrasonic transducer which is concealed within the body of an air spring or shock absorber in connection with a vehicle air spring system as does our invention described in detail below and shown in the drawings.

Therefore the need exists for an air spring system in which certain of the principle components or detecting components are located within the air suspension element or fluid pressure chamber to determine and maintain the correct axial spacing of the end members of the suspension system to eliminate contacting mechanical height sensing components heretofore used in such systems.

DISCLOSURE OF THE INVENTION

Objectives of the invention include providing an improved air spring and/or air strut for mounting on motor vehicles in which a pair of end members are sealingly connected in both open ends of a flexible elastomeric sleeve to form a fluid pressure chamber therebetween for absorbing road shock forces exerted on a vehicle and to maintain the proper spacing of the vehicle body from the axle; and in which a plurality of such air springs may be used on the vehicle to maintain the vehicle body level and to provide certain damping characteristics.

Still another objective of the invention is to provide such an improved air spring and in particular an ultrasonic leveling and damping control system therefor, in which the main sensing component, that is, an ultrasonic transducer is located internally to the air suspension element or fluid filled air sleeve thereby reducing the number of external components which are subject to the harsh environment of a vehicle and which require mounting space on the vehicle, and in which such transducers are free of contacting mechanical parts heretofore subject to wear and maintenance problems.

Still another objective of the invention is to provide such an improved ultrasonic air spring system in which the transducer produces a signal in response to the picked up sonic signals reflected from an opposite end member of the spring from which the transducer is mounted, which signal is fed to a microprocessor control module which determines whether the air chamber within the spring requires fluid compression or exhaustion, and in which the module will implement control of fluid valves to supply or exhaust fluid to or from the air chamber to maintain the desired damping characteristic or until the desired height or axial separation of the end components is achieved.

A further objective of the invention is to provide such an ultrasonic air spring system which will be immune to road noises since the ultrasonic frequency produced by the transducer is beyond the normal anticipated road noise level, in which the control module is provided with a wide range of adjustments and means to sense erroneous signals which could be submitted thereto whereby a true or average height or axial separation of the spring end components is determined even when the vehicle is in operation, and in which compensation means can be provided in the control module circuitry for temperature, pressure, humidity and air turbulence should the same be required.

A still further objective of the invention is to provide such an improved ultrasonic air spring system which can be incorporated into a usual air spring and/or air strut construction without material alterations to the air spring member thereby reducing manufacturing costs, in which the transducer and other components subject to environmental and ambient forces and conditions are of a rugged construction and thereby relatively maintenance free, in which the mounting of the transducer within the fluid pressure chamber of the air spring does not materially effect the force damping and stabilizing effect of the air spring, and in which the improved leveling and damping system requires no external components mounted on the air spring or surrounding vehicle chassis to achieve the height detecting means for supplying appropriate signals to the microprocessor or other control module.

These objectives and advantages are obtained by the improved ultrasonic air spring system of the invention, the general nature of which may be stated as including an air spring comprising a pair of end members sealing opposite open ends of a flexible sleeve forming a pressurized fluid chamber therebetween; transducer means mounted on one of the end members for transmitting ultrasonic signals through the fluid chamber towards the other end member and for receiving signals reflected from said other end member; first means responsive to the reflected signals for determining whether the spacing between the end members is greater or less than a predetermined spacing and for generating a control signal indicative thereof; and second means for exhausting or supplying pressurized fluid from or into the pressurized fluid chamber in response to the control signal from said first means.

BRIEF DESCRIPTION OF THE DRAWINGS

A preferred embodiment of the invention, illustrative of the best mode in which applicants have contemplated applying the principles is set forth in the following description and is shown in the drawings, and is particularly and distinctly pointed out and set forth in the appended claims.

FIG. 1 is a vertical sectional view with portions broken away, of the improved air spring of the invention shown in a usual at-rest position;

FIG. 2 is an enlarged fragmentary sectional view with portions broken away of a modified mounting arrangement of the transducer of the leveling system;

FIG. 3 is a fragmentary plan view looking in the direction of arrows 3—3, FIG. 1.

Similar numerals refer to similar parts throughout the drawings.

BEST MODE FOR CARRYING OUT THE INVENTION

Figure 4:
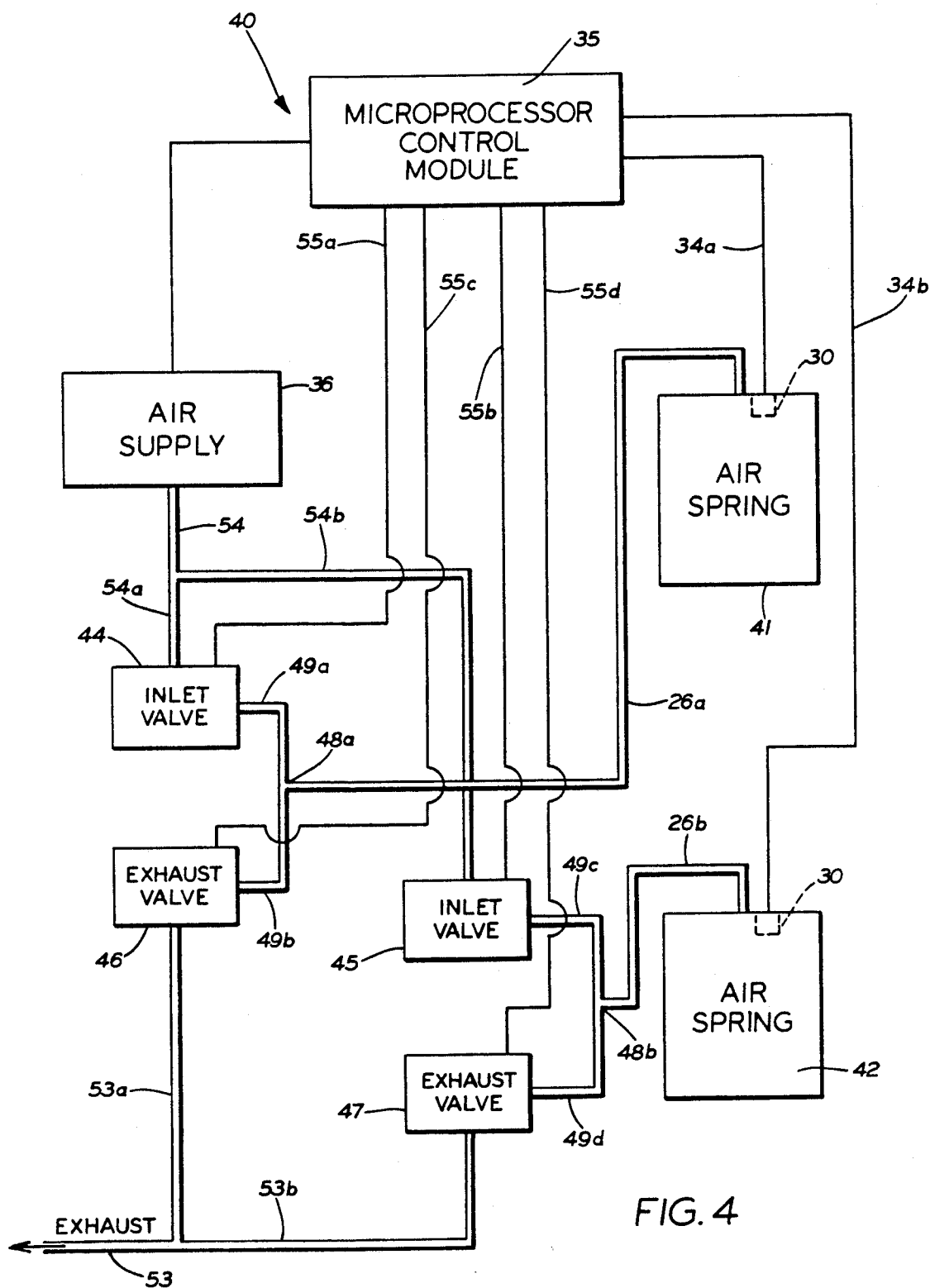
FIG. 4 is a simplified diagrammatic view of an ultrasonic air spring system of the type utilizing the improved air spring.

FIG. 1 shows an improved air spring, indicated generally at 1, of the type which is incorporated into the improved ultrasonic air spring system of the invention. Air spring 1 is shown in a normal at-rest position and includes a pair of end members, indicated generally at 2 and 3, with end member 2 being a piston and end member 3 being an end plate. Piston 2 includes a general cylindrical outer side wall 4 terminating in an outwardly flared end portion 5 and has a central annular base 6 provided with a plurality of threaded holes 7 for mounting piston 2 on a vehicle component. Annular base 6 includes a top wall 8 having a hole 9 formed therein through which a bolt 10 extends for clamping a bumper stud 11 against a dish-shaped clamp plate 13. Bolt 10 also clamps plate 13 against wall 8 and against the inner surface of a conical wall 15 which extends between wall 8 and cylindrical side wall 4. The particular construction of piston 2 may vary and forms no particular part of the invention.

Plate 13 clamps one open end of a flexible elastomeric sleeve 17 to conical wall 15 to provide a fluid-tight clamping engagement and enclosure for the lower open end of sleeve 17. The open end of sleeve 17 preferably is provided with an internal reinforcing bead 18 to assist in maintaining a fluid tight seal between the sleeve and piston wall 15. The opposite end of sleeve end 17 also is open and is sealingly connected to end plate 3 by an annular rolled flange 20 which clamps sleeve end 21 therein. A reinforcing bead 22 may be molded within open end 21 of sleeve 17 to assist in forming a fluid-tight seal with end plate 3.

End plate 3 preferably is formed of metal or a rigid plastic and has a generally disc-shaped configuration. Plate 3 terminates in outer rolled end flange 20 for clamping engagement with sleeve 17 and preferably is provided with a plurality of threaded lugs 24 for mounting plate 3 to another part of the vehicle spaced from that part of the vehicle to which piston 2 is attached. A fluid inlet port 25 is formed in plate 2 and has a fluid conduit 26 communicating therewith by an internally threaded lug 27.

In accordance with the invention, an ultrasonic transducer, indicated generally at 30, is mounted on the inside surface of end plate 3 by a plurality of fasteners 31. Transducer 30 extends into the pressurized fluid air chamber 32 formed by the interior sleeve 17. One type of ultrasonic transducer 30 found suitable for use in improved air spring 1 is a model TSR-1 transducer which operates in a multiplex mode and which is manufactured by Migatron Corporation of LaGrange, Ill. Transducer 30 is connected by conductors 34 to a microprocessor based control module 35 (FIGS. 4 and 5) which is electrically connected to an air compressor 36 or other source of pressurized fluid by conductor 37. The air compressor is connected to fluid pressure chamber 13 by fluid conduit 26 shown in FIGS. 1 and 4.

Ultrasonic signals, indicated diagrammatically at 38 in FIG. 1, are transmitted by transducer 30 with portions thereof being picked up by the transducer after being reflected by the various structural components in the opposite end of the air spring, generally the exposed components of piston 2 and the adjacent walls of the air spring. The control circuitry within module 35 determines the transmitting and receiving of the ultrasonic signals and after receiving such signals it can determine that there is an error in the height or axial separation between plate 3 and piston 2 when compared to a predetermined desirable spacing. This transmission and pick up of reflected sonic signals is referred to as an ultrasonic pulse echo technique and is used for other ultrasonic control systems well known in the art. Therefore the particular circuitry and detection means for this echo technique is not shown in detail since a variety of electronic control systems using ultrasonic pulses can be utilized.

The control circuitry determines that there is an error in the height or axial separation between the end members of the air spring which is above or below a preset distance and the error is then stored in an analog counter. If on the next reading, there is no error, then the previous error is taken out of the counter. When the counter reaches a predetermined point, a control valve is actuated to raise or lower the air spring by feeding pressurized air from air compressor 36 into the air spring or exhausting air therefrom until the preset height or spacing between end members 2 and 3 is obtained.

Preferably the system and in particular transducer 30, operates at an ultrasonic frequency which is in a range which is immune to road noise. For example, the frequency of transducer 30 will be in the range of 33 khz to 40 khz which is higher than anticipated road noises generally in the range of 3 khz. If necessary, compensation can be provided for in the control module for changes in temperature, humidity, and air turbulence within pressurized fluid chamber 32 caused by the axial movement between end plate 3 and piston 2 upon the vehicle wheel encountering depressions and projections in the road surface.

FIG. 4 shows diagrammatically an air spring system, indicated generally at 40, of the type into which the improved air spring may be incorporated. System 40 consists of a pair of air springs 41 and 42 similar to air spring 1 described above and shown in FIG. 1, which are connected to air compressor 36 through a pair of inlet valves 44 and 45 and a pair of exhaust valves 46 and 47. Air springs 41 and 42 are connected to microprocessor control module 35 by electrical conductors at 34a L and 34b, respectively, which are connected to transducers 30 mounted within the air spring as described above.

Fluid conduits 26a and 26b extend from air springs 41 and 42, respectively, and provide both the inlet and outlet for the fluid within the air springs. Fluid lines 26a and 26b are connected at a junctions 48a and 48b, respectively, to branch conduits 49a–49b and 49c–49d which are connected to their respective inlet and exhaust valves. Exhaust valves 46 and 47 are connected by exhaust conduits 53a and 53b, respectively, to a main exhaust conduit 53 which preferably communicates with the surrounding atmosphere. Correspondingly, a main fluid supply or inlet line 54 extending from pressurized fluid supply 36 is connected by branch lines 54a and 54b to inlet valves 44 and 45, respectively. Inlet valves 44 and 45 and exhaust valves 46 and 47 are each connected by electrical conductors 55a, 55b, 55c and 55d, respectively, to control module 35.

The particular system shown in FIG. 4 can be used either for maintaining the vehicle level by adjusting the volume of fluid in air springs 41 and 42 as described above, or can be used for providing instantaneous changes in the damping characteristics of the air springs by utilizing a different software package or control module and variations in the particular type of air supply and inlet and exhaust valves. In this type of control system instantaneous changes can be sensed ih the air springs through the transducers, which changes are supplied to the control module for actuation of the appropriate inlet or outlet valve for either supplying or discharging fluid into or out of either one or both of the air springs, depending upon the signal received by control module 35. Again, the particular software and types of inlet and exhaust valves required for the instantaneous correction and/or maintaining of the damping characteristics of the individual air springs are well known in the art and, therefore, are not described in detail.

In most vehicle applications, a pair of air springs will be mounted between the vehicle in spaced locations of each of the vehicle axles to maintain the vehicle body in a level position in addition to absorbing the road forces exerted thereon. Thus, the axial separation of the end members of each of the air springs 41 and 42 are detected by control module 35 through transducers 30, and depending upon the level detected, will actuate either of the inlet valves 44 and 45 to supply fluid into one or both of the air springs or actuate exhaust valves 46 and 47 for reducing the amount of pressurized fluid within either or both pressure chambers 32. Thus, leveling system 40 insures that each individual air spring has the desired amount of pressurized fluid contained therein and that the end members of both air springs are at the desired height to insure a level vehicle.

In summary, the improved ultrasonic air spring system of the invention provides a system for use with air springs and/or air struts by employing an ultrasonic transducer mounted internally of each of the air springs whereby signals from the transducers are used to determine the height or axial separation of the end members of the air spring, and through a control circuit will initiate a response to either fill or release pressurized fluid from within the pressure chamber from one or more of the air springs which may be incorporated into the leveling system. Also, the improved ultrasonic air spring system can be used for instantaneously varying the pressure within an air spring for maintaining a predetermined damping characteristic. One of the principle features of the improved ultrasonic air spring system is that the sensing or control means contain no springs, contacts or other movable mechanical parts which generally result in maintenance problems. Instead the improved system uses a sensor which is completely protected from the environment by being located within the fluid pressure chamber of the air spring.

A modified form of the transducer mounting is shown in FIG. 2 in which a transducer 50 is mounted on the outer surface of end plate 3 and aligns with a hole 51 formed in the end plate. The ultrasonic signals of the transducer, shown diagrammatically at 52, pass through hole 51 and into the interior of pressurized chamber 32 whereby certain of the reflected or rebound signals will also pass out of the chamber through hole 51 where they are detected by transducer 50 for subsequent actuation of the control module in the same manner as described above with respect to transducer 30. A jounce bumper (not shown) may be mounted on bumper stud 11 when the transducer is mounted on the outer surface of the end plate as shown in FIG. 2.

The invention further includes the method of regulating the spacing between the end members, the steps of which were described above in the description of the various components of the improved system and the operational features thereof.

Accordingly, the improved ultrasonic air spring system is simplified, provides an effective, safe, inexpensive, and efficient system and device which achieves all the enumerated objectives, provides for eliminating difficulties encountered with prior systems and devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the improved ultrasonic air spring system is constructed and used, the characteristics of the construction, and the advantageous, new and useful results obtained; the new and useful structures, devices, elements, arrangements, parts, and combinations, are set forth in the appended claims.

What is claimed is:

1. An ultrasonic air spring leveling system including:
   (a) an end plate and a piston member located in a generally axial spaced relationship when in an at-rest position, said end plate and piston member being adapted to be mounted on spaced portions of a vehicle and movable towards and away from each other upon said vehicle encountering road shocks to absorb said shocks and to maintain said spaced vehicle portions at a predetermined spaced relationship when in said at-rest position;
   (b) a fluid pressure chamber formed between said end plate and piston member by a flexible elastomeric sleeve having opposed open ends sealingly connected to said end plate and piston member;
   (c) an ultrasonic transducer mounted on an inside surface of the end plate and located within the fluid pressure chamber for transmitting ultrasonic signals through the pressure chamber to the piston member and for picking up ultrasonic signals reflected from the piston member;
   (d) electronic circuit means operatively connected to the transducer responsive to the picked up signals for generating a control signal; and
   (e) a source of pressurized fluid connected to the fluid pressure chamber and controlled by the control signal for regulating the amount of fluid within said pressure chamber to maintain a predetermined axial separation between the end plate and piston member when in said at-rest position.

2. The leveling system defined in claim 1 in which the electronic circuit means includes a microprocessor base control module, said module determining the axial separation between the end plate and piston from the picked-up reflected ultrasonic signal; and in which the control module generates the control signal which selectively actuates inlet and exhaust valves for admitting and exhausting fluid into and from the pressure chamber to achieve a predetermined axial separation between the end plate and piston member.

3. An improved method for regulating the spacing between an end plate and a piston member sealingly mounted within the open ends of a flexible elastomeric sleeve of an air spring of a suspension system including the steps of:
   (a) forming a pressurized fluid chamber within the elastomeric sleeve and between the end plate and piston member;
   (b) transmitting ultrasonic signals from a transducer located within the chamber and mounted on an inside surface of said end plate towards the piston member;
   (c) detecting a portion of the transmittal signals which are reflected from the piston member;
   (d) determining the spacing between the end plate and piston member in response to the detected, reflected signals;
   (e) generating a control signal in response to the determined spacing between the end plate and piston member; and
   (f) regulating the amount of pressurized fluid within the fluid chamber in response to the control signal for adjusting the spacing between said end plate and piston member.

4. The method defined in claim 3 in which the ultrasonic signals are generated at a frequency between 33 khz and 40 khz.

5. The method defined in claim 3 in which the amount of pressurized fluid is regulated within the fluid chamber by actuating inlet and exhaust valves for admitting and exhausting fluid into and from the fluid chamber.

6. The method defined in claim 3 in which a microprocessor based control module determines the spacing between the end plate and piston member from the detected reflected signals and generates the control signal in response thereto.

* * * * *